(12) United States Patent
Walker (10) Patent No.: US 7,817,900 B2
(45) Date of Patent: Oct. 19, 2010

(54) GPU TIMELINE WITH RENDER-AHEAD QUEUE

(75) Inventor: Brian J. Walker, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1307 days.

(21) Appl. No.: 11/170,930

(22) Filed: Jun. 30, 2005

(65) Prior Publication Data

US 2007/0006060 A1 Jan. 4, 2007

(51) Int. Cl.
*G11B 27/00* (2006.01)
*H04N 5/93* (2006.01)
*H04N 5/76* (2006.01)

(52) U.S. Cl. .......................... 386/52; 386/68
(58) Field of Classification Search ............... 386/46, 386/53, 125, 68
See application file for complete search history.

(56) References Cited

U.S. PATENT DOCUMENTS

| | | | |
|---|---|---|---|
| 5,450,544 A | 9/1995 | Dixon et al. | |
| 5,508,940 A * | 4/1996 | Rossmere et al. | 715/723 |
| 5,708,845 A | 1/1998 | Wistendahl et al. | |
| 5,715,354 A * | 2/1998 | Iwamura et al. | 386/68 |
| 5,734,783 A * | 3/1998 | Shimoda et al. | 386/68 |
| 5,913,008 A * | 6/1999 | Itou | 386/52 |
| 5,996,015 A | 11/1999 | Day et al. | |
| 6,222,979 B1 * | 4/2001 | Willis et al. | 386/46 |
| 6,226,038 B1 * | 5/2001 | Frink et al. | 348/443 |
| 6,353,700 B1 * | 3/2002 | Zhou | 386/68 |
| 6,603,922 B1 * | 8/2003 | Shino et al. | 386/125 |
| 6,763,175 B1 * | 7/2004 | Trottier et al. | 386/52 |
| 6,804,449 B1 * | 10/2004 | Desai | 386/68 |
| 7,164,844 B1 * | 1/2007 | Yap et al. | 386/68 |
| 7,194,189 B2 * | 3/2007 | Halfant | 386/68 |
| 7,409,097 B2 * | 8/2008 | Zhang et al. | 382/239 |
| 7,471,875 B2 * | 12/2008 | Mughal et al. | 386/68 |
| 7,496,283 B2 * | 2/2009 | Evans et al. | 386/124 |
| 7,630,612 B2 * | 12/2009 | Kent et al. | 386/46 |
| 2001/0026675 A1 * | 10/2001 | Schultz et al. | 386/68 |
| 2002/0106190 A1 | 8/2002 | Nygren et al. | |
| 2003/0038830 A1 | 2/2003 | Bean et al. | |
| 2004/0001694 A1 * | 1/2004 | Evans et al. | 386/68 |
| 2004/0001695 A1 * | 1/2004 | Evans et al. | 386/68 |
| 2004/0141721 A1 * | 7/2004 | Hatalsky | 386/52 |
| 2004/0187160 A1 | 9/2004 | Cook et al. | |
| 2005/0069151 A1 | 3/2005 | Dideriksen et al. | |
| 2005/0069152 A1 | 3/2005 | Dideriksen et al. | |
| 2006/0008248 A1 * | 1/2006 | Agrahara | 386/68 |
| 2006/0092776 A1 * | 5/2006 | Kuch | 369/30.86 |

* cited by examiner

*Primary Examiner*—Thai Tran
*Assistant Examiner*—Gelek Topgyal
(74) *Attorney, Agent, or Firm*—Senniger Powers LLP (57) ABSTRACT

Video editing and video playback utilizing a render-ahead queue for storing rendered video frames. The render-ahead queue facilitates the smooth playback of video in forward and reverse timeline direction, avoiding video glitches that occur when video frames are rendered at a rate that is less than the timeline rate of the video file. Embodiments of the present invention also include the use of a graphics processing unit in conjunction with the render-ahead queue to further ensure smooth playback of video.

13 Claims, 8 Drawing Sheets

| | | J=8 | I=7 | H=6 | G=5 | F=4 | E=3 | D=2 | C=1 |
|---|---|---|---|---|---|---|---|---|---|

FIG. 7B

| | | | J=8 | I=7 | H=6 | G=5 | F=4 | E=3 | D=2 |
|---|---|---|---|---|---|---|---|---|---|

FIG. 7C

| | | C=9 | J=8 | I=7 | H=6 | G=5 | F=4 | E=3 | D=2 |
|---|---|---|---|---|---|---|---|---|---|

FIG. 7D

| | | | C=9 | J=8 | I=7 | H=6 | G=5 | F=4 | E=3 |
|---|---|---|---|---|---|---|---|---|---|

FIG. 7E

| | | J=100 | I=99 | H=98 | G=97 | F=96 | E=95 | D=94 | C=93 |
|---|---|---|---|---|---|---|---|---|---|

FIG. 7F

| | | | | | | J=100 | I=99 | H=98 | G=97 |
|---|---|---|---|---|---|---|---|---|---|

FIG. 7G

| | | | | | F=101 | J=100 | I=99 | H=98 | G=97 |
|---|---|---|---|---|---|---|---|---|---|

FIG. 7H

| | C=104 | B=103 | A=102 | F=101 | J=100 | I=99 | H=98 | G=97 |
|---|---|---|---|---|---|---|---|---|

GPU TIMELINE WITH RENDER-AHEAD QUEUE

TECHNICAL FIELD

Embodiments of the present invention relate to the field of video rendering and play back of video and audio files. In particular, embodiments of this invention relate to systems and methods utilizing a graphics queue to render and smoothly display video and audio files at the frame rate of a video timeline.

BACKGROUND

Common format standards for smooth playback of video files include displaying thirty frames of video for each second of a video timeline. During the video editing process, smooth playback of video frames and audio sequences that make up video and audio files is often not obtained due to the processing of video files and the individual video frames and audio sequences that must occur prior to displaying the video file to a screen and outputting audio sequences to a speaker.

Several processes occur in video editing and playback which require central processing unit (CPU) resources. A number of these processes are part of the "pre-roll logic" which includes seeking for files, opening and decoding a first video file, rendering effects to the video frames of the file, displaying the frames to a screen, and closing the first video file, opening and decoding a second video file, and so forth. Similarly, the processing of audio sequences of an audio file as well as synchronization with video frames also requires CPU processing capacity. The CPU typically cannot perform all processes of the pre-roll logic in the time it takes for one frame of video to be displayed (e.g., one-thirtieth of a second) in order to smoothly playback the video and audio files. Consequently, video and audio playback appears choppy or halting (i.e., glitching) as the CPU performs the required pre-roll logic processes at a rate that is less than the video timeline.

Video playback in reverse also requires significant CPU resources. In addition to glitching in forward playback of video files, reverse playback of most compressed video file formats, (e.g., WMV), cannot be performed in real time. I-Frame-based video files, which is a common form of real time video format, store video frames as the difference from the previous frame. Thus, in order to playback video frame X, one must first determine the differences between frame X and the frame immediately preceding it on the video timeline (e.g., frame X-1). Therefore, reverse playback of video can be very expensive operations for the CPU to process, requiring the CPU to decode all the previous frames to the preceding key frame in a video file. Once decoded, video effects must be rendered by the CPU, consuming more of its processing resources. This process makes it difficult for the CPU to decode, render, synchronize the video frames with the audio sequences, and playback the video file in real time.

In addition to the processes of the pre-roll logic, CPU processing resources can be consumed by scheduled or random processes that occur in the background, such as receiving an email, which further limit the CPU resources that can be provided to performing the process of the pre-roll logic. Thus, as scheduled or random processes further require CPU processing time, more glitches in the video playback can occur.

Accordingly, a system and method for smooth playback of video in forward and reverse timeline directions is desired to address one or more of these and other disadvantages.

SUMMARY

The deficiencies of the known art are overcome by providing smooth video playback in both forward and reverse timeline directions. A video file is decoded and the resulting video timeline is saved directly to video memory. Embodiments of the invention utilize the resources of a graphics processing unit (GPU) which processes the effects of video frames during a rendering process. The rendered video frames are stored on a render-ahead queue in video memory. The frames are then removed from the render-ahead queue and displayed to a screen.

In another aspect, the embodiments of the invention utilize the render-ahead queue and a second queue to smoothly playback video in reverse timeline order. Video frames are decoded in forward timeline order into memory and effects are rendered upon them. The rendered frames are stored on a second queue. The frames on the second queue are then removed from the second queue in reverse order and placed on the render-ahead queue. The frames are then removed from the render-ahead queue and displayed to a screen in reverse-timeline order.

Alternatively, the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
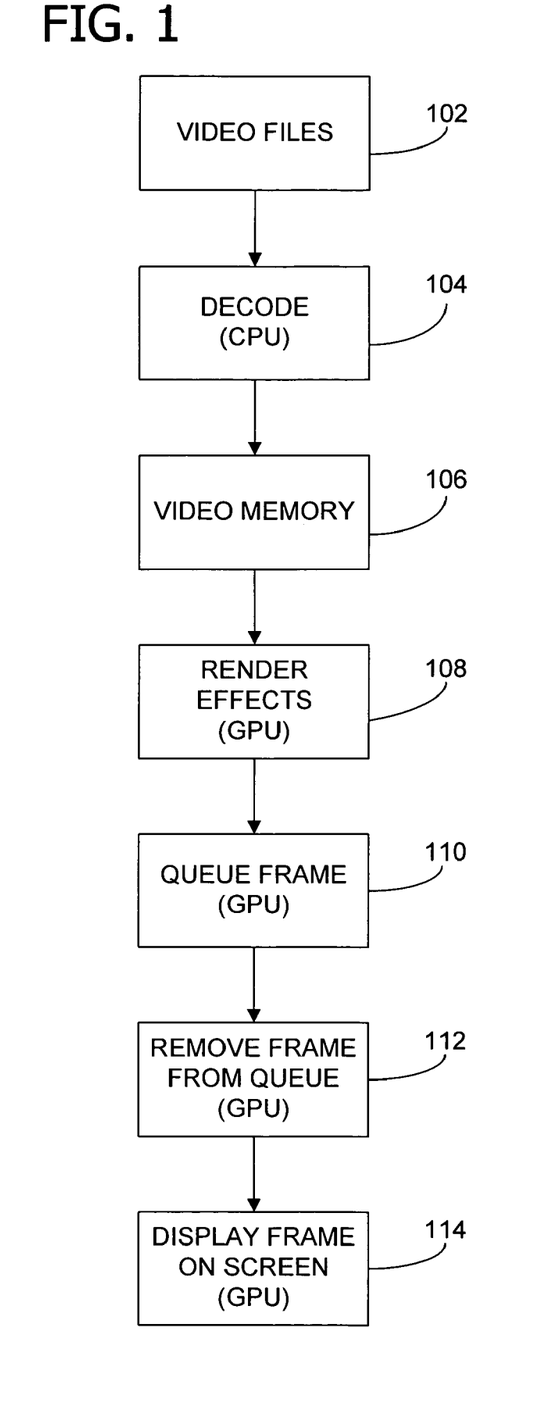
FIG. 1 is an exemplary flowchart of a method of displaying video in which the present invention may be implemented.

Referring first to FIG. 1, an exemplary flowchart is provided of a method of displaying video in which the present invention may be implemented. The method is initiated when video files are accessed at 102 by the central processing unit (CPU) and decoded at 104 into a timeline sequence of video frames. Once decoded, the CPU stores the timeline of video frames directly into video memory 106. Once in video memory, a graphics processing unit (GPU) accesses a video frame and processes any effects that are needed at 108 and then queues the processed video frame to a render-ahead queue at 110. The GPU then removes the processed video frames from the render-ahead queue at 112 at the frame rate of the video timeline and displays the video frame to a screen at 114.

In another embodiment, the CPU removes the processed video frames from the render-ahead queue and displays them on a screen.

Figure 2:
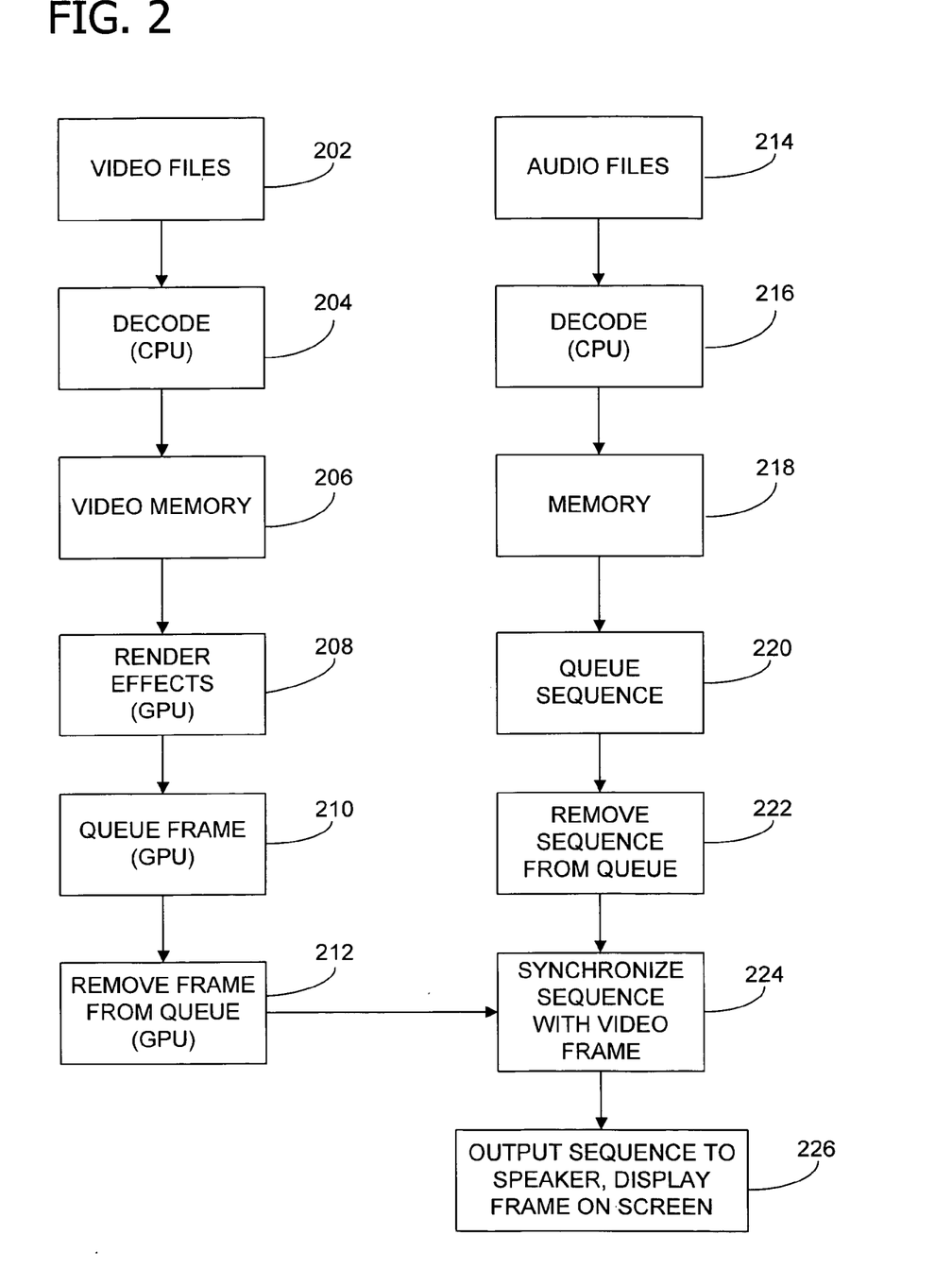
FIG. 2 is an exemplary flowchart of a method of displaying video and outputting audio in which the present invention may be implemented.

In another embodiment, the present invention provides a system and method of playing back both video and audio files during video editing. Referring to FIG. 2 an exemplary flowchart is provided of a method of displaying video and outputting audio in which the present invention may be implemented. The method is initiated when video files are accessed at 202 by the central processing unit (CPU) and decoded at 204 into a timeline sequence of video frames. Once decoded, the CPU stores the timeline of video frames directly into video memory 206. Once in video memory, a graphics processing unit (GPU) accesses a video frame and processes any effects that are needed at 208 and then queues the processed video frame to a render-ahead queue at 210.

The method also provides the processing, queuing, synchronization of audio files in conjunction with video files. Audio files are accessed at 214 by the central processing unit (CPU) and decoded at 216 into a series of audio sequences. Once decoded, the CPU stores the audio sequences directly into memory 218. Once in memory, the audio sequence is queued on an audio queue at 220.

The CPU instructs the GPU to remove the processed video frames from the render-ahead queue at 212 at the frame rate of the video timeline. The CPU initiates the process while the GPU does the heavy pixel processing. The CPU removes the audio sequence from the audio queue at 222. The video frame is synchronized with the audio sequence at 224 and the video frame is displayed to a screen and the audio sequence is output to a speaker at 226.

In another embodiment, the CPU removes the processed video frames from the render-ahead queue, removes the audio sequence from the audio queue, synchronizes the video frame with the audio sequence, and displays the video frame on a screen and outputs the audio sequence to a speaker.

Render-Ahead Queue

The present invention overcomes the deficiencies of the known art that result in glitches during playback of video files by utilizing a render-ahead queue. The render-ahead queue is created in video memory and contains video frames upon which video effects have already been rendered. Video frames are obtained from the render-ahead queue and displayed to a screen at the frame rate of the video timeline. Video frames are added to the render-ahead queue at a rate that exceeds the video timeline playback rate. Video frames can also be added to the queue when playback of the video timeline is in a paused state, allowing the number of video frames on the queue to be built up. Since video playback is started in a paused state, the queue will always contain video frames upon initiation of playback.

Since the average rate at which frames are added to the queue exceeds the rate of the video timeline, the queue remains full given no other inputs (e.g., internal events like file switching, external events like other processes using disc or CPU resources) such as random background processes of the CPU described above. Therefore, during video playback, rendered video frames can be continuously accessed from the render-ahead queue and displayed at the frame rate of the timeline, providing a smooth playback of video.

If a process occurs that consumes CPU processing resources, the render-ahead queue permits smooth playback of video until all of the queued frames have been displayed on the queue. If the process requiring CPU processing resources ceases before all the video frames on the render-ahead queue have been displayed, the CPU can resume video processes to replenish the render-ahead queue with video frames at a rate exceeding the video timeline, thereby permitting continuous smooth video playback.

The render-ahead queue also permits smooth playback of video when CPU resources are expended on video editing processes. For example, seeking a temporally compressed media format file typically cannot be performed in the time required to display a video frame. Thus, the render-ahead queue permits video editing processes to simultaneously seek and playback video to a screen by displaying video frames that are held in the render-ahead queue until the seek process is completed. Once the seek process is finished, video frames are again added to the render-ahead queue.

Figure 3:
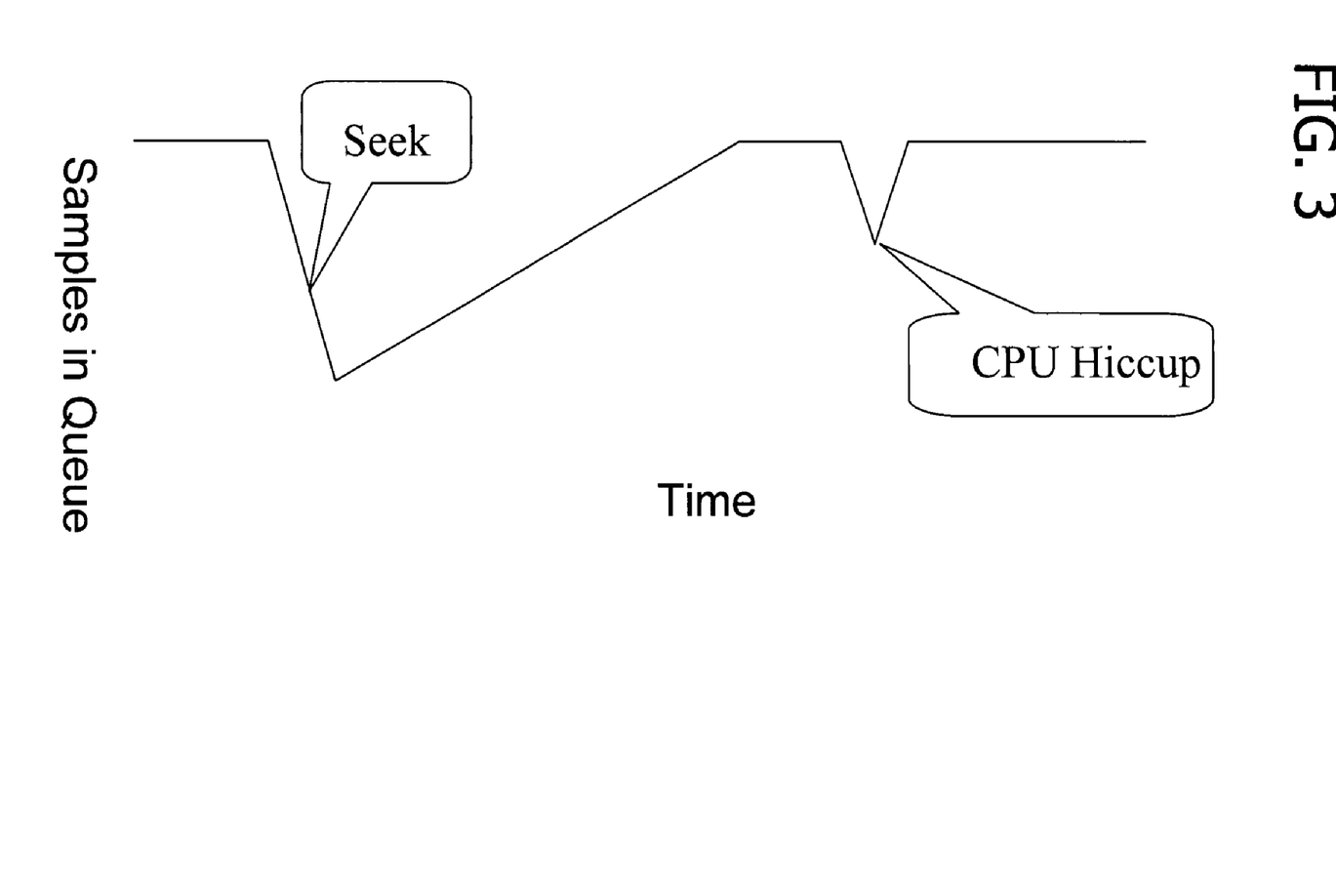
FIG. 3 is an illustration of the relative impact common processes requiring CPU resources have on the number of frames that are on the render-ahead queue.

FIG. 3 is an illustration of the relative impact that common processes requiring CPU resources have on the number of frames that are on the render-ahead queue. When a process which requires much CPU resources occurs, such as a seek process, the number of frames on the render-ahead queue begins to drop as the use of CPU resources for seeking prevents the CPU from adding frames to the render ahead queue. Once the seek process ceases, the CPU can again process frames and add them to the render-ahead queue, which is represented in the gradual upward direction of the line over a period of time. When a random process causes a CPU "hiccup" such as when CPU resources are required for a short period to handle a minor process such as an incoming email, the number of samples on the render-ahead queue drops for a short time. Once the CPU finishes the random process, it again begins to add frames to the render-ahead queue, which is again represented by line moving upward as time passes. As long as the seek process, random process or other process that requires CPU resources ceases before all of the frames on the render-ahead queue are displayed, the playback of video will be smooth. However, if CPU resources are required over a period time that exceeds the playback time of the number of frames in the render-ahead queue, the render-ahead queue will be exhausted and video glitches will occur, causing the playback of video to appear choppy.

The size of the render-ahead queue is dependent upon the hardware capacity of the computing devices used to edit and playback video. In one embodiment, the render-ahead queue contains up to thirty video frames, which is up to one second of video timeline. In another embodiment, the render-head queue contains up to sixty video frames, or up to two seconds of video timeline. In another embodiment, the render-ahead queue contains at least three frames of video. In another embodiment, the render-ahead queue contains at least five frames of video.

If the number of frames on the render-ahead queue falls below a specified number (e.g., three frames), the buffer size can be reduced to attempt to continue smooth playback of video (e.g., reduce buffer size from 640×480 to 320×280). If playback still is not smoothly displayed, the timeline speed can be reduced to slow playback which displays the frames in a slower, but smoother order.

Audio Queue

In addition to the render-ahead queue, the system and method of the present can additionally comprise an audio queue. In much the same way as the render-ahead queue is utilized for creating a buffer queue of video frames, the audio queue comprises audio sequences that are decoded from the audio files and placed into memory. By maintaining an audio queue, audio sequences can be available for synchronization with the video frames at the rate of the video file timeline without resulting in audio sequences cutting out when CPU resources are expended on other processes. Also the audio needs to be rendered ahead with the video to so that the source files are reading at the same location. If audio and video attempt to read from different locations in a file, it can result in the program to fail to respond (i.e., hangs), or cause poor disc performance.

Graphics Processing Unit

In one embodiment, a GPU is utilized to perform many of the processes previously performed by the CPU. In this configuration, a computing device can act as a multiprocessor wherein a pipeline effect exists between the CPU providing decoded video and audio files to the GPU for further processing of video effects onto video frames, queuing frames, and displaying the video frames to a screen.

By utilizing a GPU the CPU is able to expend processing resources on other video editing processes such as synchronizing video frames with audio sequences and outputting the audio sequences to a speaker. Additionally, the CPU resources are able to perform background processes, decoding files, and random processes such as processing the receipt of emails without causing disruption of the video rendering, queuing, and display processes.

Thus, the GPU further ensures that the video render-ahead queue and the audio queues contain video frames and audio sequences for smooth playback of video and audio files.

The GPU further enables the computing device to smoothly process and display complex playback processes such as reverse playback of I-Frame-based video files that would otherwise expend significant CPU resources.

Reverse Playback

The present invention utilizes the render-ahead queue and a second queue to manipulate video frames allowing for smooth playback of video files in reverse order. Reverse playback can be accomplished by first playing the video file forward for short durations into a second queue and then removing them from the second queue in reverse order and placing them on the render-ahead queue before displaying the frames in reverse order to a screen. The render-ahead queue permits the computing device to smoothly display the frames in reverse order from the render-ahead queue while executing the lengthy process of obtaining additional frames, reversing their order, and placing them on the render-ahead queue for reverse playback. The process is repeated until reverse playback is ceased or the beginning of the video file is reached.

Most video files cannot be merely played back in reverse, but rather first require processing of each video frame relative to adjacent frames before playback can occur. As discussed above, I-Frame-based video files, which is a common form of real time video format, store video frames as a series of base frames or key frames between which are intermediate frames which are stored as differences between the base frame and the intermediate frame. Thus, in order to playback video frame X, one must first determine the differences between frame X and the frame immediately preceding frame X on the video timeline (e.g., frame X-1). Thus, for example, if key frames are located at time 10 and time 20, and the video frame at time 15 is desired, the computing device must back up to the key frame at time 10 and draw the frame at time 11 by processing the differences between the frame at time 11 and the key frame at time 10. The frame at time 12 is drawn by adding the differences from the frame at time 11, and so forth until the frame at time 15 is drawn from the differences from the frame at time 14.

To obtain video frames in a reverse timeline order for display after frame X is displayed, video frames preceding video frame X on the video timeline are located and loaded into video memory. Effects are then rendered onto the frames, and the rendered frames are added to in a second queue in the forward timeline direction. The frames are then removed from the second queue in reverse order and added to the render-ahead queue immediately following frame X in the reverse timeline direction. The number of frames loaded in the queue is dependent on the available video memory and the time required to display the X frames to a screen. This process is repeated for the entire duration that the frames are displayed to the screen in reverse timeline direction.

Figure 4:
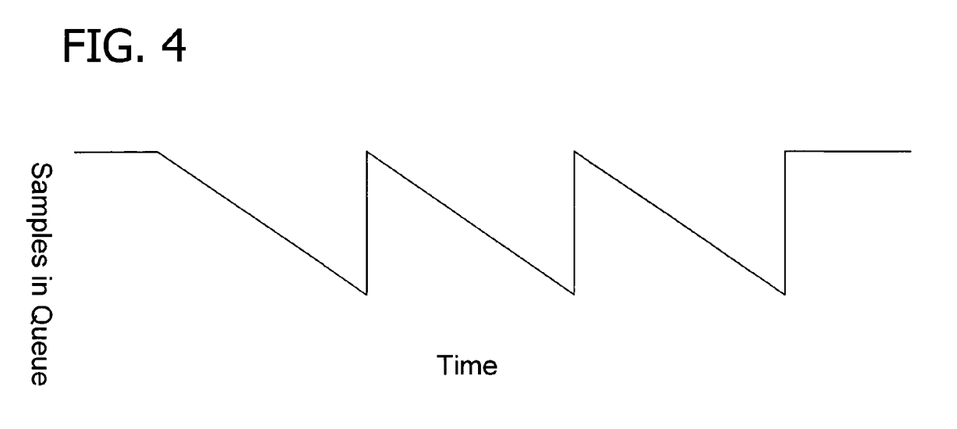
FIG. 4 is an illustration of the process of playback of frames in reverse timeline direction.

FIG. 4 is an illustration of the process of playback of frames in reverse timeline direction. As frames are displayed, the number of frames in the render-ahead queue steadily drops. At the time the frame number is dropping, additional frames that would immediately precede the frames on the render-ahead queue are located and loaded into video memory. Effects are then rendered onto the frames and the frames are added to a secondary queue. Once a specified number of frames have been added to the secondary queue, the samples are removed in reverse timeline order and added to the render-ahead queue, at which point the FIG. 4 illustrates the line spiking upward. The process is then repeated until reverse playback of the video is ceased.

Reverse Frame Stepping

Due to the I-Frame format of most video files described above, frame-stepping in the reverse timeline direction normally requires decoding of all video frames in the forward timeline direction until the frame is reached which is the starting frame of the reverse timeline direction. The render-ahead queue permits smooth frame stepping in the reverse timeline direction by displaying frames on the render-ahead queue that have been previously displayed, while also seeking and processing the next segment of video in the reverse timeline direction and placing it in the render-ahead queue for reverse playback, as described above.

In one embodiment, a specified number of video frames are maintained in the render-ahead queue after they have been displayed to a screen. Then, when a segment of video is desired in reverse timeline frame stepping, the specified number of frames are already in the render-ahead queue and available for display without requiring seeking and decoding the frames from a video file. For example, if Y frames are maintained on the render-ahead queue after display, after Z frames (a number less than Y) on the render-ahead queue are displayed in reverse timeline direction, the method of the present invention seeks for the video frames that immediately precede the Y frames on the timeline and the frames are added to the render-ahead queue in reverse order such that they will be displayed after the last Y frame is displayed in reverse timeline direction. In this embodiment, the render-ahead queue will always have between Y and Y-Z frames in the queue available for display in reverse timeline direction. In this example, Y and Z are variables representing a specified number of video frames, based upon the amount of video memory available and the amount of video memory needed to render a current section of the timeline.

Memory Manager

A video memory manager must be written to create and organize the render-ahead queue and any other queues used in the present invention. At a video frame size of 640×480, each video frame requires 1.2 Mb of memory. On a low memory card, such as 32 Mb, after system requirements for memory are taken into account, such as memory requirements for back buffers, swap chains, and the like, there are about 20 buffers available for storing video frames. On a 256 Mb card, there are in excess of about 200 buffers available for storing video frames. Since the amount of memory that is required by other processes or driver implementations cannot be calculated, the amount of buffers that are available for video and audio playback cannot be determined until they are depleted.

To avoid out of video memory errors from occurring, a custom memory manager is written that creates all the buffers needed in the video playback process of the present invention. When a buffer allocation fails (e.g., a rendered video frame cannot be added to the render-ahead queue due to running out of video memory), instead of generating an "out-of-memory" error, the custom video memory manager stalls the allocation of the rendered video frame until a frame present on the render-ahead queue is removed. When the frame is removed, the memory required for its storage on the queue is returned to the system for reallocation. The custom video memory manager then stores the rendered video frame on the buffer that was returned to the system for reallocation.

By utilizing this self-correcting algorithm, the render-ahead queue can handle switching segments of the timeline that require different amounts of memory to run. When switching from a segment that uses less video memory, the maximum size of the queue will increase to handle the new segment. Alternatively, when switching from a segment that uses more video memory, the maximum size of the queue will decrease to handle the new segment. For example, if five video memory units are on the system and the current video segment requires four units, the remaining one unit is available for use on the queue. If the current segment needs one memory unit, then the queue will have four memory units.

One embodiment of the custom memory manager is described in greater detail in the example below.

Figure 5:
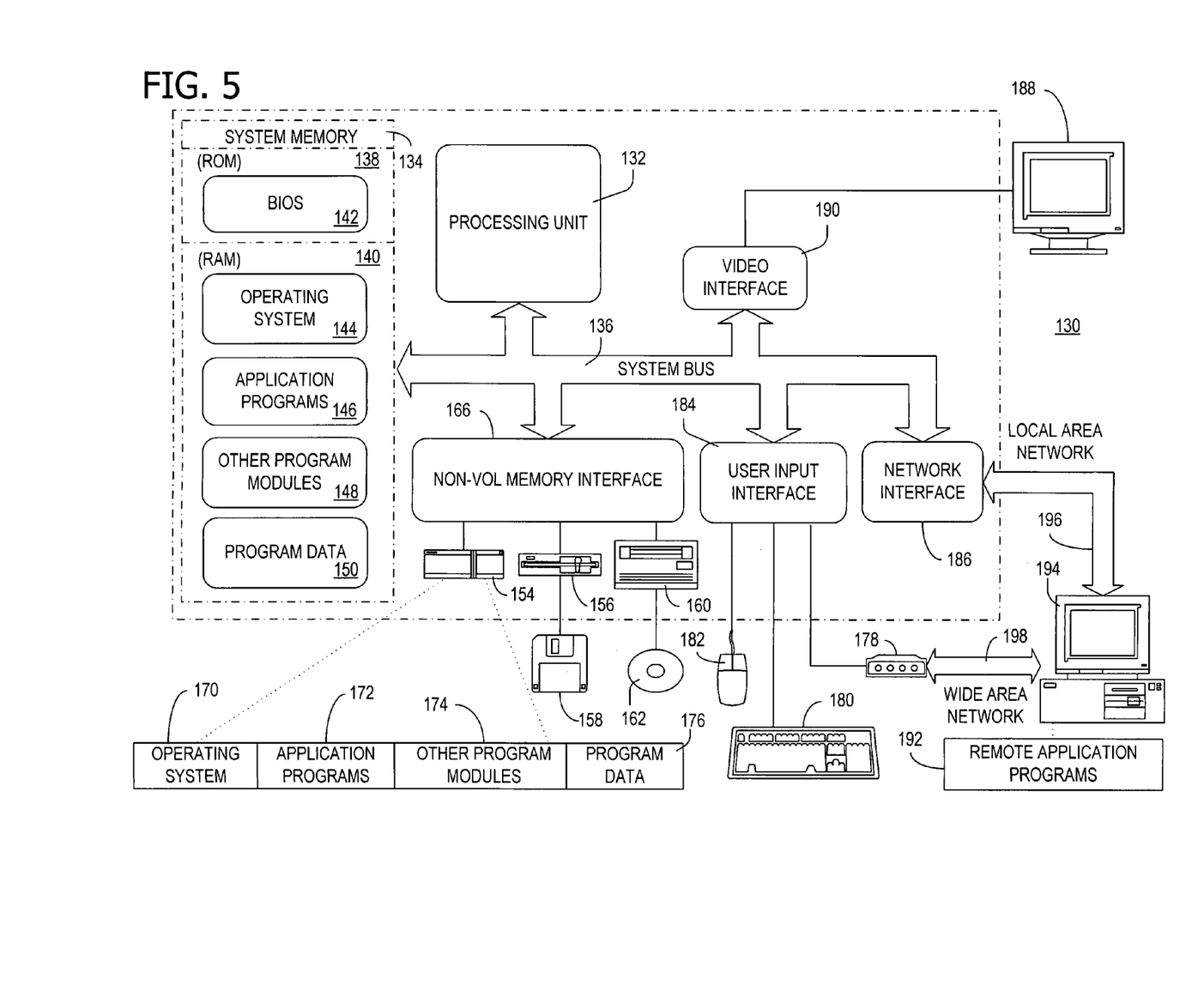
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein.

Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The following example further illustrates aspects of the invention.

EXAMPLE

Memory Management

This example illustrates the use of video frame allocation to buffers in video memory by a custom video memory manager as described above. In this example, a video card contains ten (10) video buffers of memory labeled A-J. The exemplary video editing entails two video timelines and one transition that is inserted between the two videos. During the video editing process, each video requires two working buffers and the transition requires one working buffer that are used in the manipulation of the video frames and the transition in the editing process.

Figure 6:
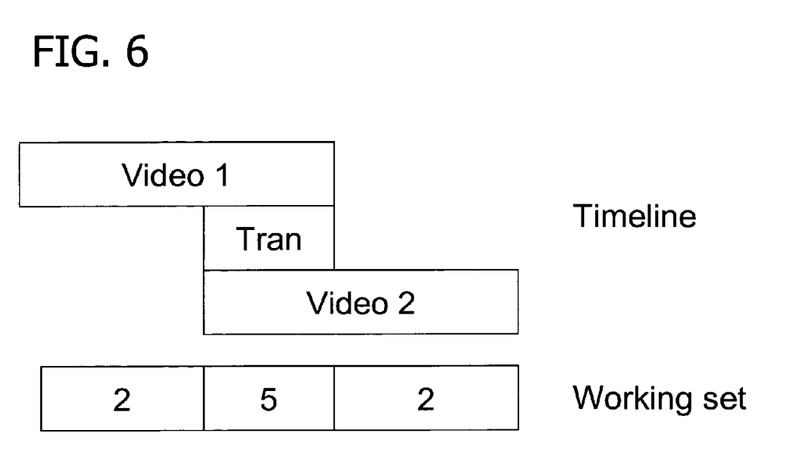
FIG. 6 is a depiction of a video timeline wherein Video 1 transitions into Video 2 over a video timeline.

FIG. 6 is a depiction of a video timeline wherein Video 1 transitions into Video 2 over a video timeline. The working set identified below the timeline indicates the number of working buffers required to manipulate the video frames and transition. At the beginning of the timeline, two working buffers, Buffers A and B, are required to process and display the video frames of Video 1. Thus, eight buffers are available to store video frames of Video 1 on the render-ahead queue.

During the transition between Video 1 and Video 2, a total of five working buffers are required, two working buffers to process and display Video 1, one working buffer to process the transition, and two working buffers to process and display Video 2. At this time only five buffers are available to store video frames on the render-ahead queue.

Once the timeline continues to the point where only Video 2 is being processed and displayed, only two working buffers are required. Thus, as before, eight buffers are available to store video frames of Video 2 on the render-ahead queue.

Figure 7A:
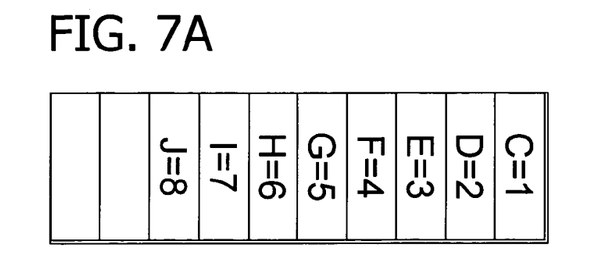
FIG. 7A is an illustration of a render-ahead queue before frame 1 of Video 1 is displayed and after frame 8 of Video 1 is rendered and queued to the render-ahead queue.

FIG. 7A is an illustration of a render-ahead queue before frame 1 of Video 1 is displayed and after frame 8 of Video 1 is rendered and queued to the render-ahead queue. Since buffers A and B are working buffers for Video 1 and buffers C-J are storing video frames 1-8, all buffers are allocated and no additional allocation can be made to a buffer until one frame is removed from the render-ahead queue and made available for storing a video frame. The letters indicate the buffer that is storing a video frame, while the numeric value is the video frame number being stored on the render-ahead queue.

Figure 7B:
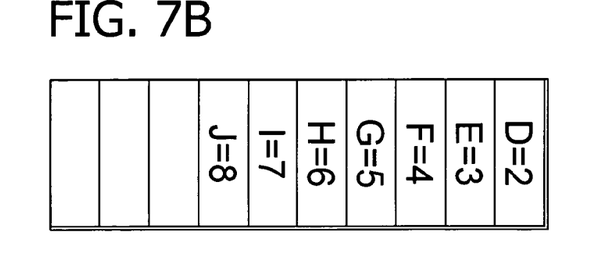
FIG. 7B is an illustration of the render-ahead queue after frame 1 of Video 1 has been displayed and removed from the queue, thereby freeing Buffer C for allocation of another video frame.

FIG. 7B is an illustration of the render-ahead queue after frame 1 of Video 1 has been displayed and removed from the queue, thereby freeing Buffer C for storing another video frame.

Figure 7C:
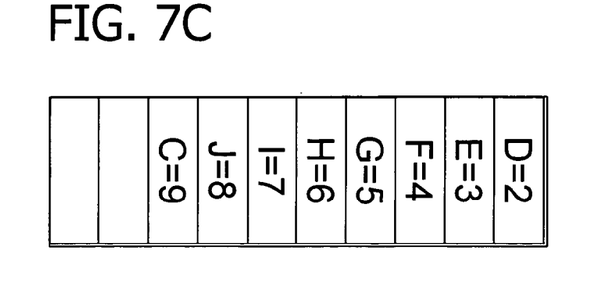
FIG. 7C is an illustration of the render-ahead queue after video frame 9 of Video 1 has been decoded, rendered, and allocated to Buffer C.

FIG. 7C is an illustration of the render-ahead queue after video frame 9 of Video 1 has been decoded, rendered, and allocated to Buffer C.

Figure 7D:
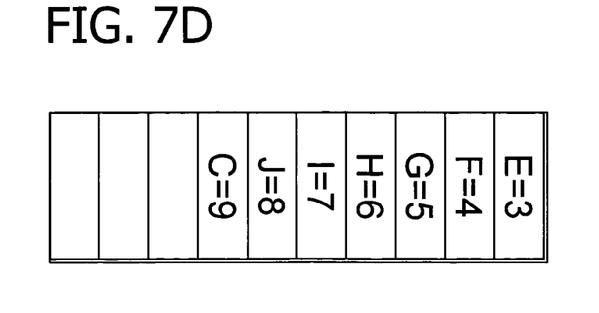
FIG. 7D is an illustration of the render-ahead queue after frame 2 of Video 1 has been displayed and removed from the queue, thereby freeing Buffer D for allocation of another video frame.

FIG. 7D is an illustration of the render-ahead queue after frame 2 of Video 1 has been displayed and removed from the queue, thereby freeing Buffer D for allocation of another video frame.

Figure 7E:
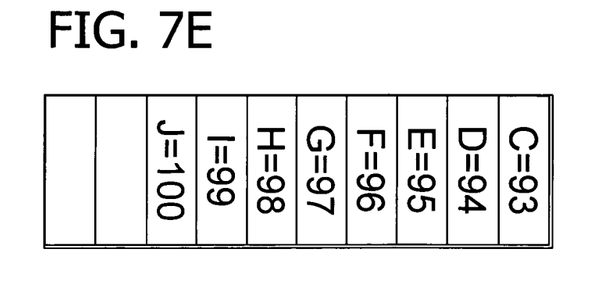
FIG. 7E is an illustration of the render-ahead queue after video frame 100 of Video 1 has been decoded, rendered, and allocated to Buffer J.

Video 1 contains 100 video frames. FIG. 7E is an illustration of the render-ahead queue after video frame 100 of Video 1 has been decoded, rendered, and allocated to Buffer J. As described above, the transition requires one working buffer and Video 2 requires two working buffers. Thus, after frame 100 of Video 1 has been queued on the render-ahead queue, a total of five working buffers are required before the transition and Video 2 can be processed.

Figure 7F:
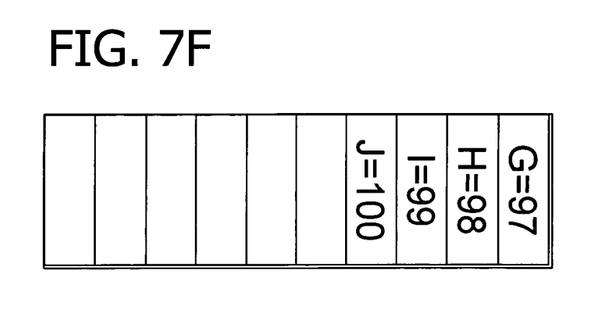
FIG. 7F is an illustration of the render-ahead queue after frame 96 of Video 1 has been displayed and removed from the queue.

FIG. 7F is an illustration of the render-ahead queue after frame 96 of Video 1 has been displayed and removed from the queue. Buffers C, D, E, and F are freed for use as working buffers for processing the transition and Video 2.

Figure 7G:
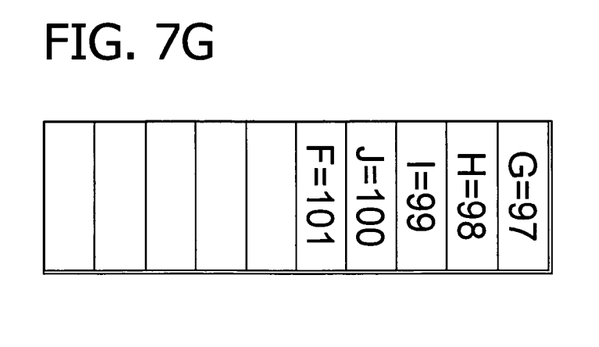
FIG. 7G is an illustration of the render-ahead queue when video frame 101 has just been decoded, rendered, and allocated to Buffer F.

FIG. 7G is an illustration of the render-ahead queue when video frame 101 has just been decoded, rendered, and allocated to Buffer F. Buffers A and B are still working buffers for Video 1 (frames 97-100), Buffer C is the working buffer for the transition, and Buffers D and E are working buffers for Video 2 (frame 101). After frame 101 of Video 2 has been queued to the render-ahead queue, Buffers A, B, and C are returned to the system as they are no longer needed as working buffers for Video 1 and the transition. Only two working buffers are thereafter required for processing Video 2, thereby allowing a total of eight buffers (e.g., Buffers A, B, C, F, G, H, I, J) to be utilized by the render-ahead queue for queuing Video 2 video frames.

Figure 7H:
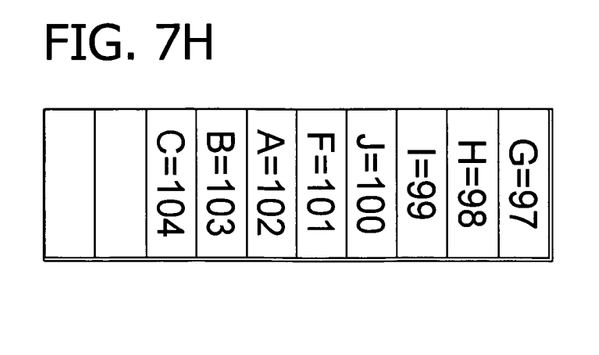
FIG. 7H is an illustration of the render-ahead queue before frame 97 of Video 1 is displayed and after frame 104 of Video 2 is rendered and queued to the render-ahead queue.

FIG. 7H is an illustration of the render-ahead queue before frame 97 of Video 1 is displayed and after frame 104 of Video 2 is rendered and queued to the render-ahead queue. Thus, eight buffers are used to store video frames during the processing of Video 2.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above system and methods without departing from the scope of the invention, it is intended that all matter contained in the above description and shown in the accompanying drawings shall be interpreted as illustrative and not in a limiting sense.

What is claimed is:

1. A computer-implemented method for displaying a plurality of video frames in a reverse order relative to a forward order, the method comprising:
   decoding in a forward order video frames in a video timeline from a video file;
   storing the decoded video frames into video memory;

rendering effects onto the stored video frames for playback at a playback rate;
queuing the rendered video frames in the forward order into a secondary queue;
removing the rendered video frames from the secondary queue in a reverse order relative to the forward order;
queuing said removed video frames into a render-ahead queue, wherein queuing video frames into the render-ahead queue occurs at a rate that exceeds the playback rate;
displaying the queued video frames from the render-ahead queue to a screen in the reverse order; and
deleting the displayed video frames from the render-ahead queue after said queued video frames have been displayed to the screen.

2. The method of claim 1, whereby a graphics processing unit renders the effects onto the video frames stored in video memory and queues the rendered video frames into the render-ahead queue.

3. The method of claim 1, whereby a central processing unit decodes the video frames and a graphics processing unit displays the rendered video frames to the screen.

4. The method of claim 1, further comprising retaining one or more video frames on the render-ahead queue after the video frames have been displayed to the screen.

5. The method of claim 1, whereby the render-ahead queue contains at least three video frames.

6. The method of claim 1, whereby the queue is comprised of memory buffers that store the rendered video frames, the method further comprising:
pausing allocation of additional rendered video frames to the render-ahead queue when all available memory buffers are full;
making the memory buffer available for allocation of video frames; and
resuming allocation of additional rendered video frames to the available buffers on the render-ahead queue.

7. The method of claim 1, wherein one or more computer-readable media have computer-executable instructions for performing the computer-executable method of claim 1.

8. A system for displaying video in a reverse order relative to a forward order, said system having a video file, video memory, a screen, a central processing unit, and a graphics processing unit, comprising:
a render-ahead queue comprising rendered video frames;
the central processing unit being configured to execute computer-executable instructions for:
decoding in a forward order a video file comprising a plurality of video frames in a video timeline into the video memory;
the graphics processing unit being configured to execute computer executable instructions for:
rendering effects onto two or more video frames in the video memory for playback at a playback rate;
queuing the rendered video frames in the forward order into a secondary queue;
removing the rendered video frames from the secondary queue in a reverse order relative to the forward order;
queuing the removed video frames in the reverse order into the render-ahead queue in the reverse order, wherein queuing video frames into the render-ahead queue occurs at a rate that exceeds the playback rate;
displaying the queued video frames from the render-ahead queue to a screen in the reverse order; and
deleting the displayed video frames from the render-ahead queue after said queued video frames have been displayed to the screen.

9. The system of claim 8, wherein said graphics processing unit is further configured to execute computer executable instructions for retaining the video frame on the render-ahead queue after it has been displayed to the screen.

10. The system of claim 8, wherein the render-ahead queue contains at least three video frames.

11. The system of claim 8, wherein the queue is comprised of memory buffers that store the rendered video frames, said graphics processing unit is further configured to execute computer executable instructions for:
pausing allocation of additional rendered video frames to the render-ahead queue when all available memory buffers are full;
making the memory buffer available to allocation of video frames; and
resuming allocation of additional rendered video frames to the available buffers on the render-ahead queue.

12. One or more non-transitory computer-readable storage media having computer-executable instructions stored thereon for performing the following steps:
rendering effects onto two or more video frames in a video timeline for playback at a playback rate;
queuing the rendered video frames in a forward order into a secondary queue;
queuing the rendered video frames from the secondary queue into a render-ahead queue in a reverse order relative to the forward order, wherein queuing video frames into the render-ahead queue occurs at a rate that exceeds the playback rate;
displaying the queued video frames from the render-ahead queue to a screen in the reverse order; and
deleting the displayed video frames from the render-ahead queue after said queued video frames have been displayed to the screen.

13. The non-transitory computer-readable storage media of claim 12, wherein the queue is comprised of memory buffers that store the rendered video frames, the computer-readable storage media further comprising computer-executable instructions for:
pausing allocation of additional rendered video frames to the render-ahead queue when all available memory buffers are full;
making the buffer available for allocation of video frames; and
resuming allocation of additional rendered video frames to available buffers on the render-ahead queue.

* * * * *